US006785803B1

United States Patent
Merchant et al.

(10) Patent No.: US 6,785,803 B1
(45) Date of Patent: Aug. 31, 2004

(54) PROCESSOR INCLUDING REPLAY QUEUE TO BREAK LIVELOCKS

(75) Inventors: Amit A. Merchant, Portland, OR (US); David J. Sager, Portland, OR (US); James D. Allen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 667 days.

(21) Appl. No.: 09/667,248

(22) Filed: Sep. 22, 2000

Related U.S. Application Data

(63) Continuation-in-part of application No. 09/106,857, filed on Jun. 30, 1998, which is a continuation-in-part of application No. 08/746,547, filed on Nov. 13, 1996, now Pat. No. 5,966,544.

(51) Int. Cl.[7] .............................................. G06F 9/38
(52) U.S. Cl. ...................................... 712/219; 712/244
(58) Field of Search ................................ 712/219, 218, 712/217, 205, 206, 23, 24, 28, 212, 244, 233, 231

(56) References Cited

U.S. PATENT DOCUMENTS

| | | | | |
|---|---|---|---|---|
| 4,409,654 A | * | 10/1983 | Wada et al. ................ | 711/213 |
| 4,709,324 A | * | 11/1987 | Kloker ........................ | 712/207 |
| 5,185,871 A | * | 2/1993 | Frey et al. .................. | 712/205 |
| 5,287,522 A | * | 2/1994 | Brown et al. ............... | 712/244 |
| 5,479,616 A | * | 12/1995 | Garibay et al. ............. | 712/212 |
| 5,611,061 A | * | 3/1997 | Yasuda ....................... | 712/244 |
| 5,615,375 A | * | 3/1997 | Ibusuki et al. .............. | 710/264 |
| 5,642,499 A | * | 6/1997 | Ohba et al. ................. | 712/228 |
| 5,655,103 A | * | 8/1997 | Cheng et al. ............... | 711/152 |
| 5,812,837 A | * | 9/1998 | Ozawa ....................... | 712/220 |
| 5,872,951 A | * | 2/1999 | Tran ........................... | 712/218 |
| 5,890,003 A | * | 3/1999 | Cutts et al. ................. | 710/263 |

* cited by examiner

Primary Examiner—Henry W. H. Tsai
(74) Attorney, Agent, or Firm—John F. Kacvinsky

(57) ABSTRACT

A technique is provided for breaking a stalled condition or livelock in a processor having a replay queue. A livelock or stalled condition is detected. One or more instructions are temporarily stored in a replay queue. A release or break in the livelock or stalled condition is detected, and the instructions are then unloaded from the replay queue for replay or re-execution. For a multi-threaded processor, a stall is detected in one of the threads. Instructions of the stalled thread are temporarily stored in a replay queue, except the oldest instruction of the stalled thread which is allowed to replay or re-execute. This allows other threads to have access to execution and replay resources. Eventually, the oldest instruction will execute and retire, which breaks or releases the stalled thread. The instructions stored in the replay queue are then unloaded from the replay queue.

20 Claims, 6 Drawing Sheets

FIG. 2

THREAD A

. . .

instr. a0 - Lock Line X instr. a1
instr. a2
instr. a3
instr. a4

. . .

instr. a60 - Unlock Line X

THREAD B

. . .

instr. b0 - LD X   (instr. b0 is an access to line X; but line X is locked; so instr. b0 and its dependents get replayed)

dep. instr. b1
dep. instr. b2   (dep. on instr. b0; so these get replayed as well)
dep. instr. b3

. . .

dep. instr. b50

PROCESSOR INCLUDING REPLAY QUEUE TO BREAK LIVELOCKS

CROSS-REFERENCE TO RELATED APPLICATIONS

This application is a continuation-in-part of U.S. patent application Ser. No. 09/106,857, filed Jun. 30, 1998 and entitled "Computer Processor With a Replay System" which is a continuation-in-part of application Ser. No. 08/746,547 filed Nov. 13, 1996 entitled "Processor Having Replay Architecture" now U.S. Pat. No. 5,966,544.

FIELD

The invention generally relates to processors, and in particular to the use of a replay queue to break livelocks or a stalled condition.

BACKGROUND

The primary function of most computer processors is to execute a stream of computer instructions that are retrieved from a storage device. Many processors are designed to fetch an instruction and execute that instruction before fetching the next instruction. However, in other processors, instructions can be executed out of order. In some out of order processors, there is a possibility that a livelock or a stalled condition can occur where the processor continues executing instructions, but the processor does not make forward progress (i.e., no additional instructions are retired). The livelock or stalled condition can occur for a number of different reasons. One example where a livelock can occur is in a multi-threaded processor where an instruction of one thread inhibits or precludes execution of the other threads. Current architectures do not adequately address the problem of livelocks.

Therefore, a need exists for a technique to detect and break livelocks in processors, including multi-threaded processors.

BRIEF DESCRIPTION OF THE DRAWINGS

The foregoing and a better understanding of the present invention will become apparent from the following detailed description of exemplary embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and is not limited thereto. The spirit and scope of the present invention being limited only by the terms of the appended claims.

The following represents brief descriptions of the drawings, wherein:

FIG. 2 is a diagram illustrating an example livelock.

DETAILED DESCRIPTION

I. Introduction

According to an embodiment of the present invention, a processor is provided that speculatively schedules instructions for execution and includes a replay system. Speculative scheduling allows the scheduling latency for instructions to be reduced. The replay system replays instructions that were not correctly executed when they were originally dispatched to an execution unit. For example, a memory load instruction may not execute properly if there is a L0 cache miss during execution, thereby requiring the instruction to be replayed (or re-executed).

However, one challenging aspect of such a processor is the possibility that a livelock or stalled condition may occur. For example, a first thread may stall, eventually causing the slots or resources in the replay system to be occupied by the first thread instructions. Thus, the stalled thread may block or inhibit execution of the other threads. It is also possible that a stalled condition or livelock could also occur in a single-threaded processor.

Therefore, according to an embodiment, a technique is provided for breaking a stalled condition or livelock in a processor. A livelock or stalled condition is detected. One or more instructions are temporarily stored in a replay queue, while allowing an oldest instruction to replay or re-execute. Loading instructions into a replay queue opens or makes available the execution resources and replay resources for the oldest instruction. Eventually the oldest instruction will properly execute and retire, breaking the stalled condition or livelock. The instructions are then unloaded from the replay queue for replay or re-execution.

Such a technique can also be applied to break or release a stall or livelock in a multi-threaded processor. In such a case, a stall is detected in one of the threads. Instructions of the stalled thread are temporarily stored in a replay queue, except for the oldest instruction of the stalled thread which is allowed to replay or re-execute. This allows other threads to have access to execution and replay resources. Eventually, the oldest instruction will execute and retire, which breaks or releases the stalled thread. The instructions stored in the replay queue are then unloaded from the replay queue.

II. Overall System Architecture

Figure 1:
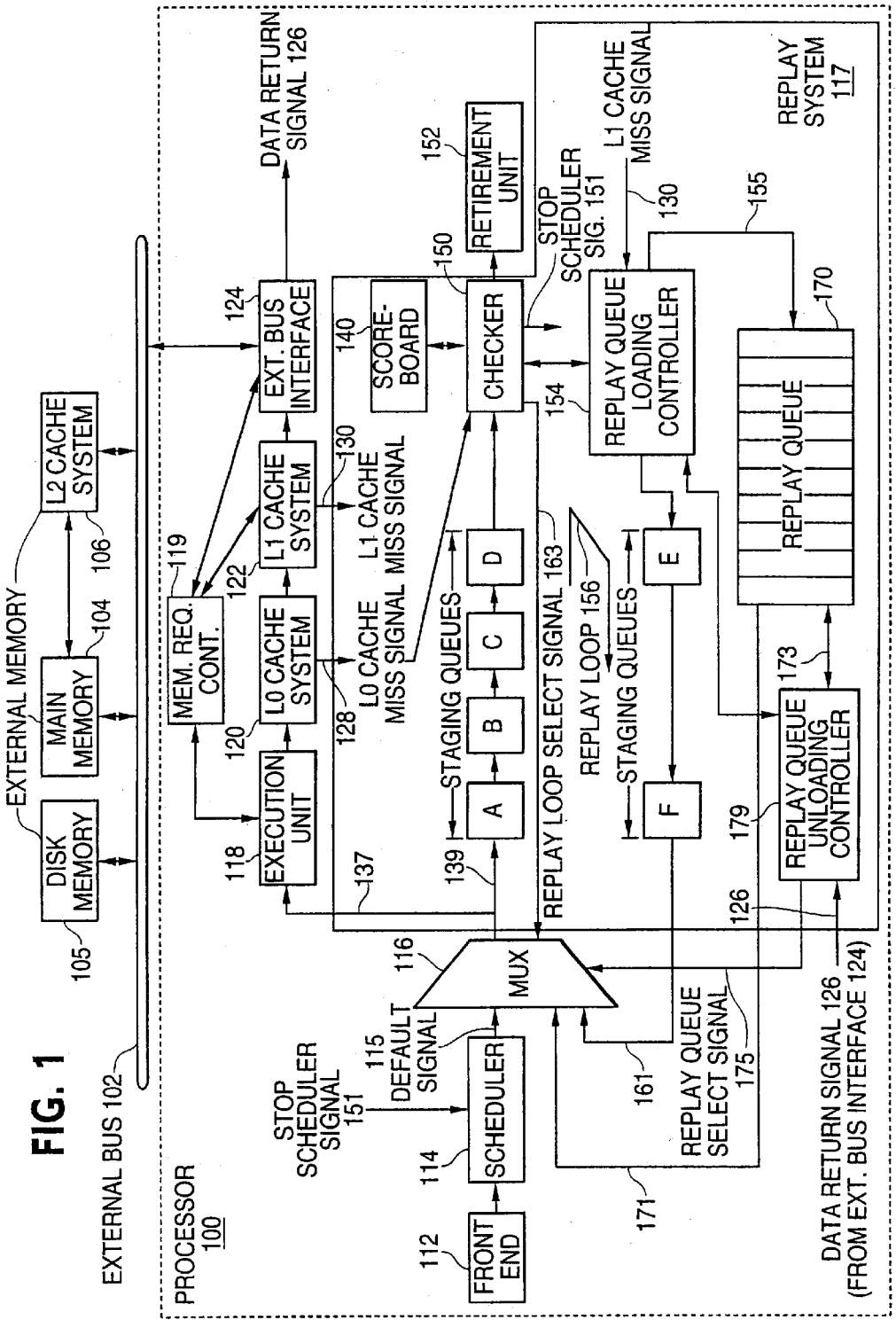
FIG. 1 is a block diagram illustrating a computer system that includes a processor according to an example embodiment.

FIG. 1 is a block diagram illustrating a computer system that includes a processor according to an embodiment. The processor 100 includes a Front End 112, which may include several units, such as an instruction fetch unit, an instruction decoder for decoding instructions (e.g., for decoding complex instructions into one or more micro-operations or uops), a Register Alias Table (RAT) for mapping logical registers to physical registers for source operands and the destination, and an instruction queue (IQ) for temporarily storing instructions. In one embodiment, the instructions stored in the instruction queue are micro-operations or uops, but other types of instructions can be used. The Front End 112 may include different or even additional units. According to an embodiment, each instruction includes up to two logical sources and one logical destination. The sources and destination are logical registers within the processor 100. The RAT within the Front End 112 may map logical sources and destinations to physical sources and destinations, respectively.

Front End 112 is coupled to a scheduler 114. Scheduler 114 dispatches instructions received from the processor Front End 112 (e.g., from the instruction queue of the Front End 112) when the resources are available to execute the instructions. Normally, scheduler 114 sends out a continuous stream of instructions. However, scheduler 114 is able to detect, by itself or by receiving a signal, when an instruction should not be dispatched. When scheduler 114 detects this, it does not dispatch an instruction in the next clock cycle. When an instruction is not dispatched, a "hole" is formed in the instruction stream from the scheduler 114, and another device can insert an instruction in the hole. The instructions are dispatched from scheduler 114 speculatively. Therefore, scheduler 114 can dispatch an instruction without first determining whether data needed by the instruction is valid or available.

Scheduler 114 outputs the instructions to a dispatch multiplexer (mux) 116. Alternativley, the mux 116 can be placed before the scheduler 114. In the example embodiment shown in FIG. 1, the output of mux 116 includes two parallel paths, including an execution path (beginning at line 137) and a replay path (beginning at line 139). The execution path will be briefly described first, while the replay path will be described below in connection with a description of a replay system 117.

The output of the multiplexer 116 is coupled to an execution unit 118. Execution unit 118 executes received instructions. Execution unit 118 can be an arithmetic logic unit ("ALU"), a floating point ALU, a memory unit for performing memory loads (memory data reads) and stores (memory data writes), etc. In the embodiment shown in FIG. 1, execution unit 118 is a memory load unit that is responsible for loading data stored in a memory device to a register (i.e., a data read from memory).

Execution unit 118 is coupled to multiple levels of memory devices that store data. First, execution unit 118 is directly coupled to an L0 cache system 120, which may also be referred to as a data cache. As described herein, the term "cache system" includes all cache related components, including cache memory, and cache TAG memory and hit/miss logic that determines whether requested data is found in the cache memory. L0 cache system 120 is the fastest memory device coupled to execution unit 18. In one embodiment, L0 cache system 120 is located on the same semiconductor die as execution unit 18.

If data requested by execution unit 118 is not found in L0 cache system 20, execution unit 118 will attempt to retrieve the data from additional levels of memory devices through a memory request controller 119. After the L0 cache system 120, the next level of memory devices is an L1 cache system 122. Accessing L1 cache system 122 may be 4–16 times as slow, for example, as accessing L0 cache system 120. In one embodiment, L1 cache system 122 is located on the same processor chip as execution unit 118, but is typically slower than the L0 cache system 120. If the data is not found in L1 cache system 122, execution unit 118 is forced to retrieve the data from the next level memory device, which is an external memory device coupled to an external bus 102. An external bus interface 124 is coupled to memory request controller 119 and external bus 102. The next level of memory device after L1 cache system 122 is an L2 cache system 106. Access to L2 cache system 106 may be 4–16 times as slow as access to L1 cache system 122, for example.

After L2 cache system 106, the next level of memory device is main memory 104, which typically comprises dynamic random access memory ("DRAM"), and then disk memory 105. Access to main memory 104 and disk memory 105 is substantially slower than access to L2 cache system 106. In one embodiment, the computer system includes one external bus dedicated to L2 cache system 106, and another external bus used by all other external memory devices. In other embodiments of the present invention, processor 100 can include greater or less levels of memory devices than shown in FIG. 1. Disk memory 105, main memory 104 and L2 cache system 106 may be considered external memory because they are coupled to the processor 100 via external bus 102.

When attempting to load data to a register from memory, execution unit 118 first attempts to load the data from the first and fastest level of memory devices (i.e., L0 cache system 120), the second fastest (i.e., L1 cache system 122) and so on. Of course, the memory load takes an increasingly longer time as an additional memory level is required to be accessed. When the data is finally found, the data retrieved by execution unit 118 is also stored in the lower levels of memory devices for future use.

For example, assume that a memory load instruction requires "data-1" to be loaded into a register. Execution unit 118 will first attempt to retrieve data-1 from L0 cache system 120. If it is not found there, execution unit 18 will next attempt to retrieve data-1 from L1 cache system 122. If it is not found there, execution unit 118 will next attempt to retrieve data-1 from L2 cache system 106. If data-1 is retrieved from L2 cache system 106, data-1 will then be stored in L1 cache system 122 and L0 cache system 120 in addition to being retrieved by execution unit 118.

A. General Description of a Replay System

Processor 100 further includes a replay system 117. Replay system 117 replays instructions that were not executed properly when they were initially dispatched by scheduler 114. Replay system 117, like execution unit 118, receives instructions output by dispatch multiplexer 116. Execution unit 118 receives instructions from mux 116 over line 137, while replay system 117 receives instructions over line 139.

Replay system 117 includes two staging sections. One staging section includes a plurality of staging queues A, B, C and D, while a second staging section includes staging queues E and F. Staging queues delay instructions for a fixed number of clock cycles. In one embodiment, staging queues A–F each comprise one or more latches. The number of stages can vary based on the amount of staging or delay desired in each execution channel. Therefore, a copy of each dispatched instruction is staged through staging queues A–D in parallel to being staged through execution unit 118. In this manner, a copy of the instruction is maintained in the staging queues A–D and is provided to a checker 150, described below. This copy of the instruction may then be routed back to mux 116 for re-execution or "replay" if the instruction did not execute properly.

Replay system 117 further includes a checker 150 and a replay queue 170. Generally, checker 150 receives instructions output from staging queue D and then determines which instructions have executed properly and which have not. If the instruction has executed properly, the checker 150 declares the instruction "replay safe" and the instruction is forwarded to retirement unit 152 where instructions are retired in program order. Retiring instructions is beneficial to processor 100 because it frees up processor resources, thus allowing additional instructions to begin execution.

An instruction may execute improperly for many reasons. The most common reasons are a source dependency and an external replay condition. A source dependency can occur when a source of a current instruction is dependent on the result of another instruction. This data dependency can cause the current instruction to execute improperly if the correct data for the source is not available at execution time (i.e., the result of the other instruction is not available as source data at execution time).

A scoreboard 140 is coupled to the checker 150. Scoreboard 140 tracks the readiness of sources. Scoreboard 140 keeps track of whether the source data was valid or correct prior to instruction execution. After the instruction has been executed, checker 150 can read or query the scoreboard 140 to determine whether data sources were not correct. If the sources were not correct at execution time, this indicates that the instruction did not execute properly (due to a data dependency), and the instruction should therefore be replayed.

Examples of an external replay condition may include a cache miss (e.g., source data was not found in L0 cache system 120 at execution time), incorrect forwarding of data (e.g., from a store buffer to a load), hidden memory dependencies, a write back conflict, an unknown data/address, and serializing instructions. The L0 cache system 120 generates a L0 cache miss signal 128 to checker 150 if there was a cache miss to L0 cache system 120 (which indicates that the source data for the instruction was not found in L0 cache system 120). Other signals can similarly be generated to checker 150 to indicate the occurrence of other external replay conditions. In this manner, checker 150 can determine whether each instruction has executed properly.

If the checker 150 determines that the instruction has not executed properly, the instruction will then be returned to multiplexer 116 to be replayed (i.e., re-executed). Each instruction to be replayed will be returned to mux 116 via one of two paths. Specifically, if the checker 150 determines that the instruction should be replayed, the Replay Queue Loading Controller 154 determines whether the instruction should be sent through a replay loop 156 including staging queues E and F, or whether the instruction should be temporarily stored in a replay queue 170 before returning to mux 116. Instructions routed via the replay loop 156 are coupled to mux 116 via line 161. Instructions can also be routed by controller 154 for temporary storage in replay queue 170 (prior to replay). While the replay data provided via line 161 and the data via line 171 from replay queue 170 are both input to mux 116, this is only an example embodiment. In other embodiments, the data on lines 161 and 171 can be input to different muxes or selection circuits.

Instructions can be loaded into replay queue 170 for different reasons. In one embodiment, an instructions which may be a relatively long latency instruction can be temporarily stored in the replay queue 170 until the instruction is ready to execute. One example is a memory load or store instruction where there is a L1 cache system miss, which requires the data to be retrieved across the external data bus 102. Retrieving data from an external memory device across the external data bus 102 requires a long latency before the data is ready. In such an embodiment, the long latency instructions (and possibly one or more dependent instructions) can be loaded into the replay queue when a L1 cache miss signal 130 is detected by replay queue loading controller from the L1 cache system 122. When the data returns from external memory, an external bus interface 124 generates a data return signal 126 to the replay queue unloading controller 179. The replay queue unloading controller 179 can then unload the long latency instruction (and its dependents) from the replay queue 170 to the mux 116 for replay or re-execution. According to another embodiment, one or more instructions can be temporarily stored in replay queue 170 to clear or open execution resources and staging queue slots in the replay loop 156 to break or end a livelock. The instructions stored in replay queue 170 are output or unloaded under control of replay queue unloading controller 179. The instructions output from replay queue 170 are coupled to mux 116 via line 171.

In conjunction with sending a replayed instruction to mux 116, checker 150 sends a "stop scheduler" signal 151 to scheduler 114. According to an embodiment, stop scheduler signal 151 is sent to scheduler 114 in advance of the replayed instruction reaching the mux 116 (either from replay loop 156 or replay queue 170). In one embodiment, stop scheduler signal 151 instructs the scheduler 114 not to schedule an instruction on the next clock cycle. This creates an open slot or "hole" in the instruction stream output from mux 116 in which a replayed instruction can be inserted.

B. Example Instruction Format

Figure 4:
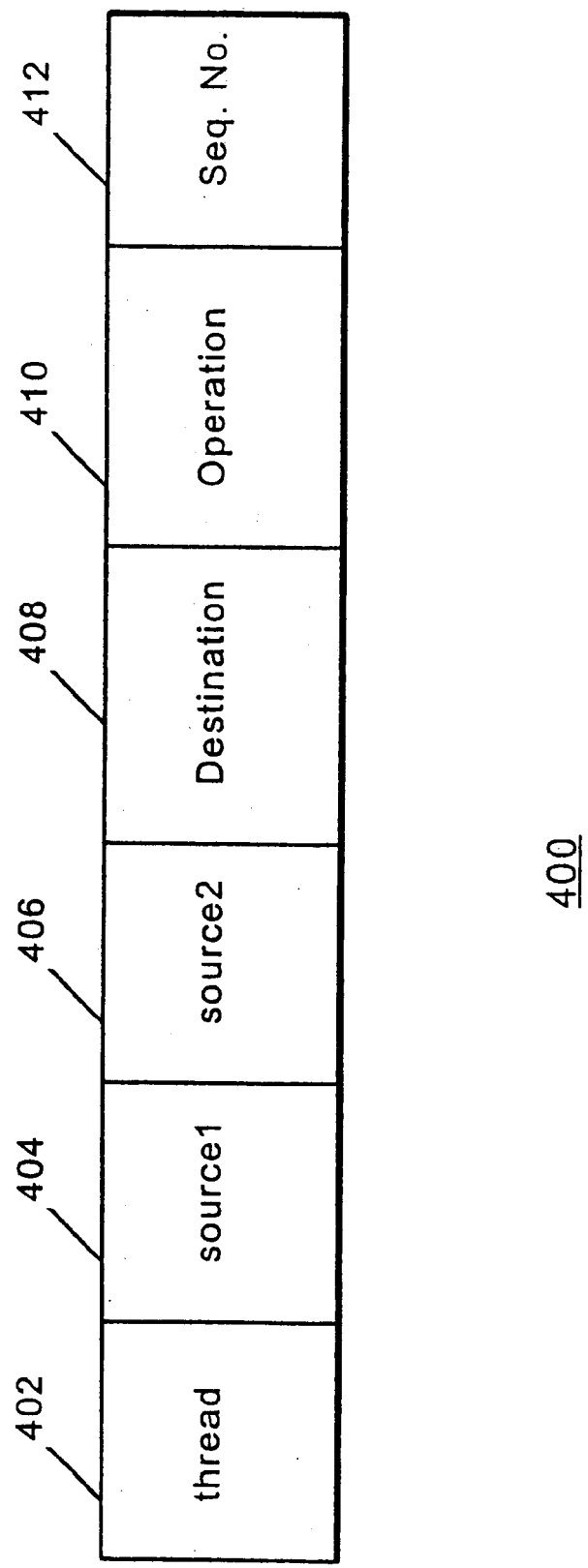
FIG. 4 is a diagram illustrating an example format of an instruction provided in a replay path according to an example embodiment.

FIG. 4 is a diagram illustrating an example format of an instruction 400 provided in a replay path according to an embodiment. As shown in FIG. 4, the instruction 400 that is staged along the replay path (e.g., beginning at line 137) may include several fields, such as the sources (source1 404 and source2 406), a destination 408 and an operation field 410 that identifies the operation to be performed (e.g., memory load). According to an embodiment, processor 100 may be a multi-threaded machine. Therefore, a thread field 402 is provided to identify which thread an instruction belongs.

III. An Illustration of an Example Livelock

FIG. 2 is a diagram illustrating an example livelock. According to an embodiment, the processor 100 (FIG. 1) may be a single-threaded processor or a multi-threaded processor. The example livelock or stalled condition will be illustrated with reference to multiple threads. However, it may be possible for a livelock or stalled condition to also occur in a single-threaded processor as well.

In a fair scheduling arrangement, all threads will be given equal (or at least some) access to the execution and replay resources of processor 100. However, if some threads are making forward progress but one thread stalls (i.e., no additional instructions are being retired), the stalled thread may eventually fill up or occupy all execution and replay resources in the processor (e.g., including occupying all staging queues in replay system 117). As noted above, after an instruction executes, the checker 150 checks the instruction to determine whether it executed properly. The instruction will either be retired (if it executed properly) or it will be replayed (if it executed improperly). A stalled thread can occupy or block all of the execution resources and replay resources because improperly executed instructions will be continually replayed or re-executed in processor 100. Thus, in some cases, a stalled thread can prevent the other threads from making forward progress (i.e., a stalled thread can prevent instructions from the other threads from properly executing and retiring). Moreover, this situation can result in a livelock in which neither thread will be able to make forward progress. An example livelock will be described below.

Referring to FIG. 2, a series of instructions are illustrated for each of two threads of a processor. Although only two threads are shown, the processor may have any number of threads. Thread A includes the instructions a0, a1, a2, a3, a4, . . . a60. Similarly, thread B includes instructions b0, b1, b2, b3, . . . b50. Only a portion of each thread is illustrated in FIG. 2.

As shown in FIG. 2, instruction a0 of thread A locks the cache line X in memory (where X is some address in memory). According to the example in FIG. 2, thread A does not unlock cache line X until many instructions later at instruction a60. Line locks are not uncommon and can occur is many different ways. For example, there may be a separate "lock" bit that allows the cache line to be locked. The MESI (modified, exclusive, shared, invalid) cache protocol allows an agent to lock or have exclusive use over a cache line. There may be other examples where a cache line can be locked.

Shortly after instruction a0 of thread A executes and locks cache line X, instruction b0 of thread B is decoded, output by mux 116 and is executed by execution unit 118 (FIG. 1). Instruction b0 is a load instruction (for example) and requires an access to the cache line X. However, instruction b0 is denied access to cache line X because it has been locked. As a result, instruction b0 does not execute properly and is routed by checker 150 and controller 154 back to mux 116 for replay (or re-execution) via the replay loop 156. There are many additional instructions in thread b, including instructions b1, b2, b3, . . . b50 which are dependent upon instruction b0. Thus, because instruction b0 replayed, all its dependents (b1, b2, b3, . . . b50) will be replayed as well.

In many instances, the instructions routed to mux 116 for replay from replay loop 156 will be given priority over the instructions from scheduler 114. As a result, instruction b0 and its dependents (b1, b2, b3, . . . b50) will be repeatedly replayed (thereby excluding entry of new instructions from scheduler 114) because the cache line X has been locked. Thus, it is possible that the replayed instructions for thread B (b0, b1, b2, b3, . . . b50) will soon occupy all the available slots or resources in the replay system 117, including the staging queues A–F. As a result, subsequent instructions from thread A, including instruction u60, can be inhibited or precluded from entering execution unit 118 for execution (because the replayed instruction may be given priority over the instructions from scheduler 114).

Thus, to summarize the livelock in this example, the instructions b0–b50 cannot properly execute and retire until cache line X is unlocked. On the other hand, instruction a60 cannot even enter to be executed to unlock the cache line X until at least some of the instructions from thread B have been cleared from the replay system 117 because the replayed instructions from thread B have blocked entry of the thread A instructions into the execution unit 118 and replay system 117. This is an example of a livelock because the processor can continue to execute instructions without making any forward progress (i.e., without any additional instructions being retired). Livelocks can occur for a variety of reasons, and can occur both for multi-threaded and single-threaded processors. FIG. 2 illustrates only one example of a livelock.

Therefore, this livelock may be considered to be analogous to a highway traffic jam created from an automobile accident. For example, a car accident has resulted in a disabled vehicle which has blocked all lanes in a highway, causing a traffic jam. The traffic jam has blocked the tow truck from reaching the site of the disabled vehicle, and the tow truck is therefore unable to remove the disabled vehicle from the highway. The cars in the traffic jam are unable to pass the disabled vehicle in the highway. Similarly, the repeated replay of the thread B instructions through the replay system 117 based on the locked cache line has occupied all slots in the replay system 117 and blocked or inhibited the entry and execution of the a60 instruction which will unlock the cache line X. According to an embodiment, this livelock can be broken by temporarily storing the thread B instructions in the replay system 156 into a replay queue 170 to release or open resources for the execution of the thread A instructions.

IV. An Example use of a Replay Queue to Break a Livelock

Figure 3:
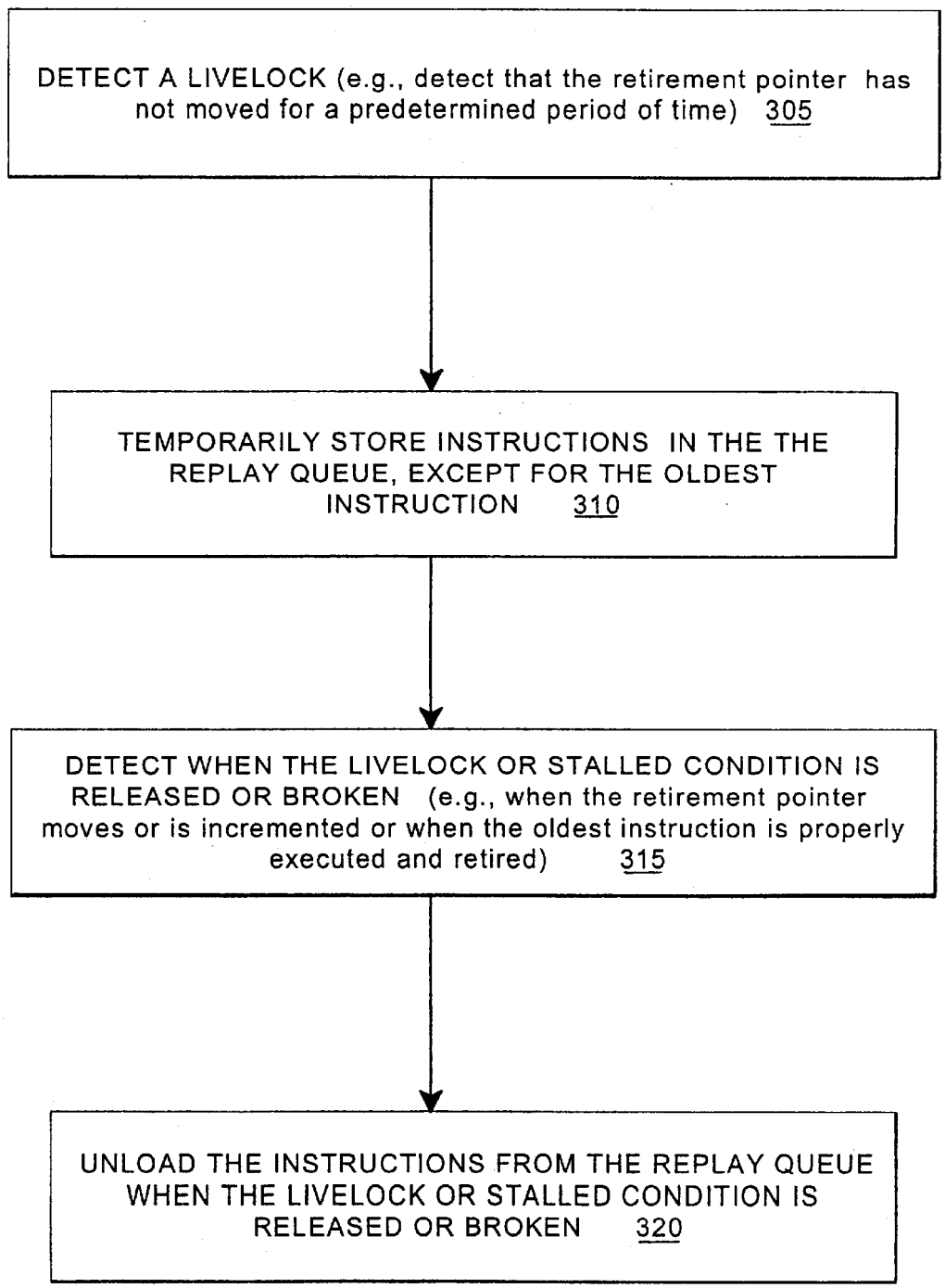
FIG. 3 is a flow chart illustrating an example operation of a processor according to an example embodiment.

FIG. 3 is a flow chart illustrating an example operation of a processor according to an example embodiment. At block 305, a livelock (or stalled condition) is detected. The processor includes a retirement pointer that points to the next instruction to be retired. According to an embodiment, instructions are retired in program order. When an instruction is retired, the retirement pointer is incremented or moves forward to the next instruction to be retired. One way in which a livelock (or stalled condition of the processor) can be detected is by monitoring the retirement pointer. If the retirement pointer does not move or increment or make progress for a minimum or predetermined period of time (e.g., 10,000 clock cycles), then a livelock or stalled condition can be assumed. For example, the retirement unit 152 may monitor the retirement pointer and notify the checker 150 and/or replay queue loading controller 154 that a stalled condition or livelock has been detected (e.g., if the retirement pointer does not move forward for a predetermined period of time). Other techniques can be used to detect a livelock or stalled condition.

At block 310, after a livelock or stalled condition has been detected, one or more of the instructions in the replay system 117 are temporarily stored in the replay queue 170. According to an embodiment, all of the instructions in the replay system 117 will be loaded into the replay queue 170. According to an embodiment, the programmatically oldest instruction in the replay system 117 is detected, for example, based on a comparison of the sequence numbers of between each of the instructions (e.g., the oldest instruction will have the smallest or lowest sequence number). The oldest instruction in the replay system 117 is then unloaded from the replay queue 170, and is allowed to replay or re-execute many times (e.g., allowed many passes through the replay system 117 if necessary). In other words, the instructions in the replay system except the oldest are loaded into the replay queue 170. The oldest instruction may be immediately allowed to replay, or it may be stored for a short period of time and then unloaded for replay. Because instructions are retired in program order, the proper execution and retirement of this oldest instruction should identify when the livelock or stalled condition has been released or broken.

Also, new instructions from scheduler 114 may be input from mux 116 to execution unit 118 for execution as well. After execution, these new or younger instructions (younger than the oldest instruction) may or may not be stored in the replay queue 170 as well.

If these new or younger instructions will be loaded into the replay queue, an age (or sequence number) comparison can be used to decide whether to load them into the replay queue (e.g., load all instructions into the replay queue that are detected at checker 150 as being younger than the oldest instruction that is being replayed, or which have a different sequence number). This, in effect, will cause all instructions in the processor to be loaded into the replay queue, except the oldest instruction, which is allowed to replay.

By storing some or all of the instructions of the processor (except the oldest) in the replay queue 170, this releases or opens execution resources (e.g., execution unit 118) and replay resources (e.g., staging queues) for execution and replay of the oldest instruction. As noted above, instructions are retired in program order. Therefore, the oldest instruction should eventually execute properly and be retired. The retirement of the oldest instruction will cause the retirement pointer to move forward or progress (e.g., to be incremented). When the oldest instruction is retired (and the retirement pointer moves forward), the livelock or stalled condition is now broken or released.

Thus, at block 315 of FIG. 3, the processor detects when the livelock or stalled condition has been broken or released. The retirement unit152, for example, may monitor the retirement pointer and notify the checker 150 and the replay queue unloading controller 179 that the livelock or stalled condition has been broken or released.

At block 320, after the livelock or stalled condition is broken or released, the instructions stored in the replay queue 170 are sequentially unloaded (e.g., one per clock cycle) under control of replay queue unloading controller 179 via line 171 to the mux 116 for replay (or re-execution). The processor 100 will also stop loading instructions into the replay queue (until another livelock or stalled condition is detected). The replay queue select signal 175 can be asserted to cause mux 116 to select instructions output from replay queue 170 via line 171 for output by mux 116. (If the replay queue select signal 175 is not asserted, the replay loop select signal 163 can be asserted by checker 150 to select the instructions from the replay loop 156 to be output from mux 116. If neither of signals 163 and 175 are asserted, the mux 116 will by default output the instructions output from the scheduler 114.) Thus, in this manner, the livelock or stalled condition can be broken or released.

Figure 5:
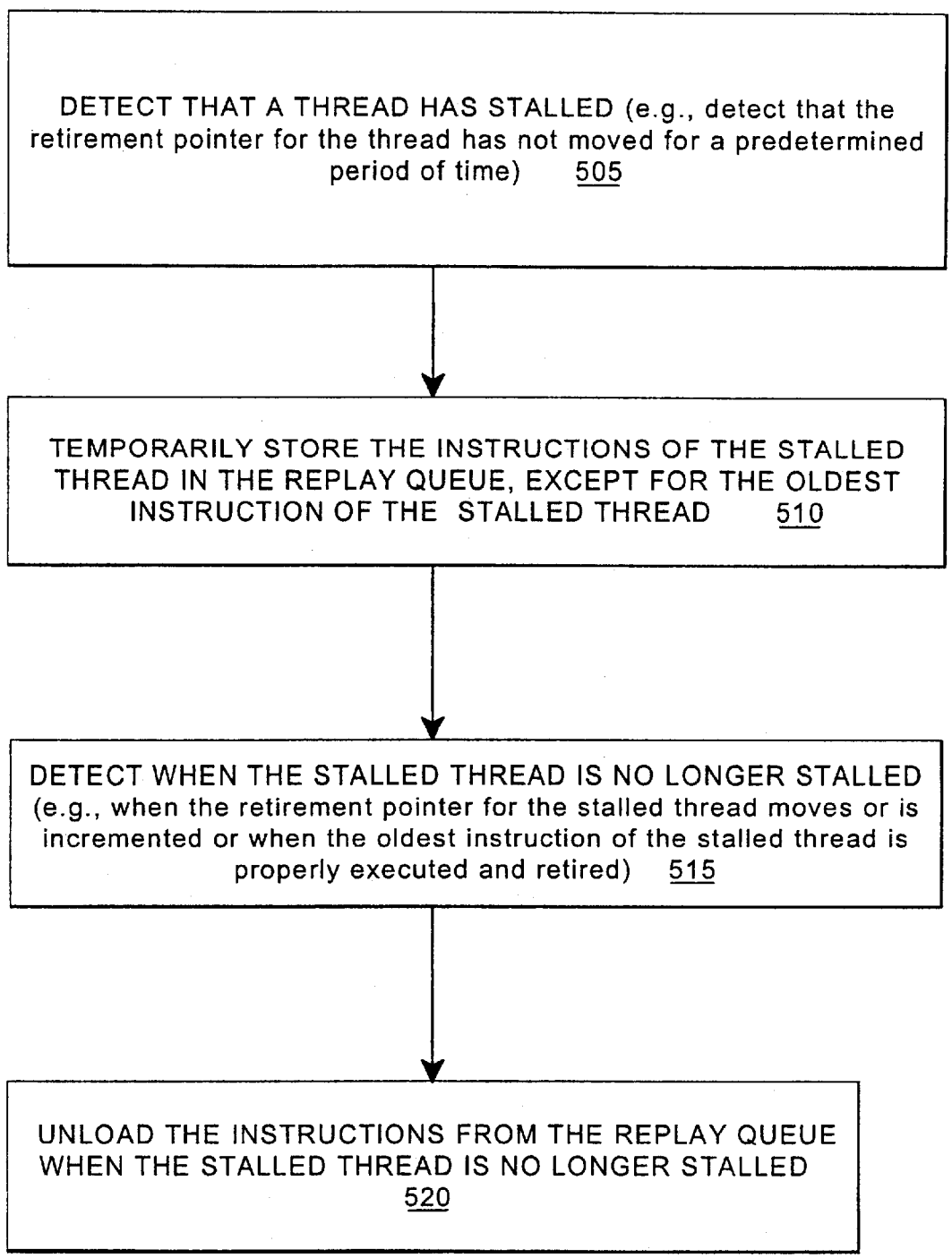
FIG. 5 is a flow chart illustrating an example operation of a processor according to another example embodiment.

FIG. 5 is a flow chart illustrating an example operation of a processor according to another example embodiment. The operation of FIG. 5 may be specifically applied to a multi-threaded processor.

Figure 6:
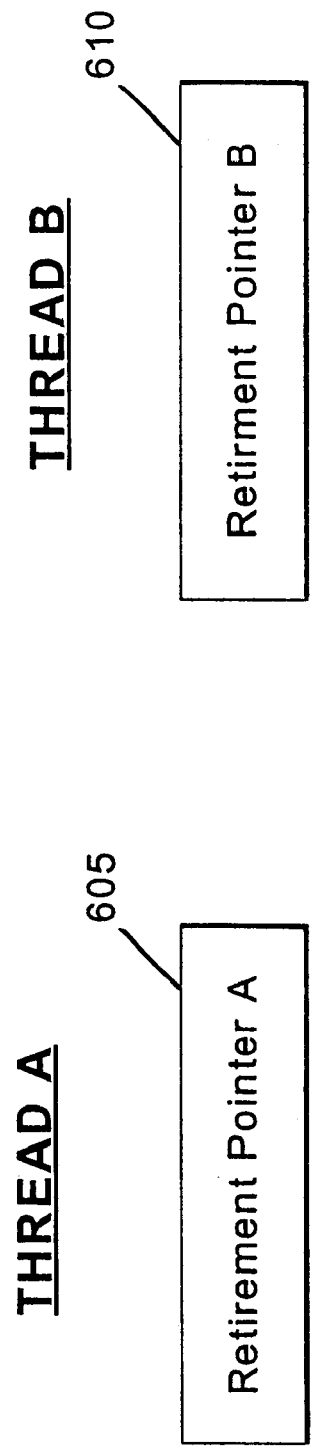
FIG. 6 is a diagram illustrating retirement pointers for multiple threads according to an embodiment.

Referring to FIG. 5, at block 505, the processor 100 detects that one of the threads has stalled. According to an embodiment, there is a retirement pointer for each thread. FIG. 6 is a diagram illustrating retirement pointers for multiple threads according to an embodiment. A retirement pointer A 605 is provided for thread A, while a retirement pointer B 610 is provided for thread B. A stalled thread can be detected when one of the retirement pointers does not move or make progress for a predetermined period of time (e.g., for a predetermined number of clock cycles).

An example of this situation is where thread B (illustrated in FIG. 2) stalls and does not make forward progress for a predetermined period of time due to the lock on cache line X. As noted above, this likely indicates the occurrence of a livelock as described above for FIG. 2. The retirement unit 152 will notify checker 150 and replay queue loading controller 154 that one of the threads (i.e., thread B in this example) has stalled (no forward progress made for a predetermined period of time), and identifies the thread.

It should be noted that, as described above in connection with FIG. 2, after thread B stalls (due to the lock on cache line X), thread A may also subsequently stall due to the blockage or occupation of resources by the replaying instructions of thread B. As a result, the retirement unit 152 may detect that both threads A and B have stalled. However, thread B in this example will stall first, and thus, will be the first to be stalled (or make no forward progress) for the predetermined period of time. The retirement unit 152 and/or the checker 150 will keep track of these threads, and will select the first thread to stall for the predetermined period of time (thread B in this example) for loading into the replay queue (as described below for block 510).

It would be advantageous to provide all threads in the processor with equal or at least reasonably fair access to the execution resources and replay resources because it can be very inefficient for one thread to monopolize the resources. Unfortunately, once one thread stalls, there is the possibility that it will block or inhibit the execution of other threads, as described above in connection with FIG. 2.

Therefore, according to an embodiment, at block 510, the instructions in the processor of the stalled thread (i.e., the first stalled thread if multiple stalled threads have been detected) are stored in the replay queue 170 under control of replay queue unloading controller 179. The instructions for the stalled thread can be identified by checker 150 or controller 154 based on the thread field 402 (FIG. 4), and then sequentially loaded into replay queue 170 as they pass through checker 150 to replay queue loading controller 154 for replay. The oldest instruction of the first stalled thread is identified and unloaded or allowed to replay. When properly executed and retired, this oldest instruction will provide an identification of when the stalled thread is no longer stalled.

According to an embodiment, as new instructions of the stalled thread are output by mux 116, these stalled thread instructions are also detected by checker 150 (based on the thread field 402) and loaded into the replay queue 170. In this manner, all (or at least some) instructions in the processor of the stalled thread (other than the oldest instruction of the stalled thread) can be loaded into the replay queue 170 (including those instructions of the stalled thread already in the replay system 117 and those instructions of the stalled thread as they enter the replay system 117 from the scheduler 114).

By placing some or all of the instructions of the stalled thread into the replay queue 170 (except the oldest instruction of the stalled thread), execution and replay resources are released or made available for the execution of instructions for other threads. Execution and replay resources are also made available for the oldest instruction of the stalled thread. Thus, this technique advantageously allows the stalled thread to release or become unstalled, while at the same time, other threads will not be blocked or inhibited from execution and replay.

In the example of FIG. 2, by placing instructions of thread B (which stalled first) into the replay queue 170, execution slots or execution resources are made available for the execution of instructions of other threads (thread A in this example) which are present in the replay system 117 or which are input from scheduler 114 to mux 116. Eventually, this should allow the instruction a60 to enter the system and be executed and retired to unlock the cache line X. The oldest instruction of the stalled thread (thread B) in this example is instruction b0, which has been replaying or circulating through the replay system 117, awaiting access to cache line X. When instruction a60 finally executes and retires, the lock to cache line X is released. This allows the instruction b0 to finally access cache line X, properly execute and retire. The retirement of this oldest instruction of the stalled thread (e.g., instruction b0) causes the retirement pointer for the stalled thread to move forward, indicating that the stalled condition or the livelock has been broken or released (the stalled thread is no longer stalled).

Thus, at step 515, the processor detects when the stalled thread is broken or released (i.e., is no longer stalled.) The retirement unit 152 can detect the movement or incrementing of the retirement pointer for the stalled thread and notifies checker 150 and replay queue unloading controller 179 when this occurs.

At block 520, after the stalled thread is no longer stalled (e.g., when the retirement pointer for the stalled thread moves forward), the instructions in the replay queue 170 are unloaded to mux 116 for replay or re-execution.

Therefore, according to an embodiment, a livelock or stalled condition can be broken or released by detecting that a thread has stalled. Instructions of the stalled thread are loaded into a queue (e.g., the replay queue 170), except the oldest instruction of the stalled thread which is allowed to replay. This opens or makes available execution and replay resources for the other threads and for the oldest instruction of the stalled thread. When the oldest instruction of the stalled thread retires, this indicates that the stalled condition or livelock has been broken or released, and the instructions in the replay queue are unloaded for replay or re-execution. In this manner, the replay queue can be advantageously used to break or release livelocks or stalled conditions.

In some instances, a replay queue can be used to alternate execution between threads (or ping-pong between threads). For instance, a first thread can be loaded into a replay queue, while allowing the remaining threads to continue execution. At some point, the first thread is unloaded from the replay queue to be allowed to execute. A second thread is then loaded into the replay queue while allowing remaining threads to execute. In this manner, execution resources can be directed to a specific thread or threads. For example, a policy or policies (e.g., execution policy or policies) may be implemented within controllers 154 and 179 to load and unload replay queue 170 (or multiple replay queues), depending on the policy. The execution policies may be based on a wide variety of factors, including detection of a stall or stalled condition with one of the threads, the demand for execution resources by different threads or user applications, etc.

If a stalled thread is detected, it may be desirable to load the instructions of the stalled thread into a replay queue to allow the other threads to execute. However, after a detection of a stalled thread, there may be instances in which it is desirable to load one more threads which have not stalled into the replay queue. In fact in some instances, loading one or more instructions from the stalled thread into the replay queue may not be enough to allow the stalled thread to release. As an example, if a stall or stalled condition is detected for thread 1, then all (or a plurality) of instructions of thread 1 except the oldest instruction (as an example) can be loaded into the replay queue, allowing the remaining threads to execute (as described above). However, in some cases, the oldest instruction of the stalled thread may be unable to execute and retire. Therefore, after a predetermined period of time in which the stalled condition was not released (i.e., if the oldest instruction of the stalled thread did not execute and retire), the instructions of the stalled thread can be released or unloaded from the replay queue. One or more instructions of the remaining (unstalled) threads can then be loaded into the replay queue for a period of time and allowed to execute. Thereafter, the replay queue is then unloaded, and all (or one or more) instructions of the stalled thread except the oldest instruction are loaded again into the replay queue. It is expected that the oldest instruction will then be able to execute and retire, releasing the stalled thread.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A method of breaking a stalled condition or livelock in a processor having a replay queue, comprising:

detecting a livelock or stalled condition by detecting that a retirement pointer of the processor has not changed for a minimum period of time;

temporarily storing one or more instructions in a replay queue;

detecting that the livelock or stalled condition has been broken or released;

and unloading the instructions from the replay queue for replay or re-execution.

2. A method of breaking a stalled condition or livelock in a processor having a replay queue, comprising;

detecting a livelock or stalled condition;

temporarily storing one or more instructions in a replay queue, with the instructions in the replay queue not including an oldest instruction in the processor;

detecting that the livelock or stalled condition has been broken or released; and unloading the instructions from the replay queue for replay or re-execution.

3. A method of breaking a stalled condition or livelock in a processor having a replay queue, comprising:

detecting a livelock or stalled condition;

temporarily storing one or more instructions in a replay queue by storing all of the instructions in the replay queue except an oldest instruction;

detecting that the livelock or stalled condition has been broken or released; and unloading the instructions from the replay queue for replay or re-execution.

4. The method of claim 3 wherein said step of temporarily storing comprises the steps of:

detecting an oldest instruction based on a comparison of sequence numbers; and temporarily storing the instructions in the processor in the replay queue except the oldest instruction.

5. A method of breaking a stalled condition or livelock in a processor having a replay queue, comprising:

detecting a livelock or stalled condition;

temporarily storing one or more instructions in a replay queue;

detecting that the livelock or stalled condition has been broken or released by detecting that a retirement pointer has moved; and unloading the instructions from the relay queue for replay or re-execution.

6. A method of breaking a stalled condition in a multi-threaded processor having a replay queue, comprising:

detecting a stall in one of threads by detecting that a retirement pointer of a thread has not changed for a minimum period of time;

temporarily storing one or more instructions of the stalled thread in a replay queue; detecting that the stall has been broken or released; and unloading the instructions from the replay queue for replay or re-execution.

7. A method of breaking a stalled condition in a multi-threaded processor having a replay queue, comprising:

detecting a stall in one of threads;

temporarily storing one or more instructions of the stalled thread in a replay queue by storing a plurality of the instruction of the stalled thread in the replay queue, the plurality of instructions in the replay queue not including an oldest instruction of the stalled thread;

detecting that the stall has been broken or released; and unloading the instructions from the replay queue for replay or re-execution.

8. A method of breaking a stalled condition in a multi-threaded processor having a replay queue, comprising:
detecting a stall in one of threads;
temporarily storing one or more instructions of the stalled thread in a replay queue except an oldest instruction of the stalled thread;
detecting that the stall has been broken or released; and
unloading the instructions from the replay queue for replay or re-execution.

9. A method of breaking a stalled condition in a multi-threaded processor having a replay queue, comprising:
detecting a stall in one of threads;
temporarily storing one or more instructions of the stalled thread in a replay queue by detecting an oldest instruction of the stalled thread based on a comparison of sequence numbers; and
temporarily storing the instructions of the stalled thread in the replay queue except the oldest instruction of the stalled thread;
detecting that the stall has been broken or released; and
unloading the instructions from the replay queue for replay or re-execution.

10. A method of breaking a stalled condition in a multi-threaded processor having a replay queue, comprising:
detecting a stall in one of threads; temporarily storing one or more instructions of the stalled thread in a replay queue;
detecting that the stall has been broken or released by detecting that a retirement pointer of the stalled thread has moved or changed; and
unloading the instructions from the replay queue for replay or re-execution.

11. A method of breaking a stalled condition in a multi-threaded processor having a replay queue, comprising:
detecting a stall in one of threads by detecting a first thread to stall, the first thread to stall being detected by having a retirement pointer that is the first retirement pointer to remain fixed for a minimum period of time;
temporarily storing one or more instructions of the stalled thread in a replay queue; detecting that the stall has been broken or released; and
unloading the instructions from the replay queue for replay or re-execution.

12. A method of breaking a stalled condition in a multi-threaded processor having a replay queue, the method comprising:
detecting that a retirement pointer for a first thread has not moved for a minimum period of time;
detecting an oldest instruction of the first thread;
temporarily storing a plurality instructions of the first thread in a replay queue, while allowing the oldest instruction of the first thread and instructions of other threads to be replayed;
detecting that the retirement pointer of the first thread has made forward progress; and
unloading the instructions from the replay queue for replay or re-execution in response to the step of detecting that the retirement pointer of the first thread has made forward progress.

13. A processor comprising:
an execution unit to execute instructions;
a replay system coupled to the execution unit to replay instructions which have not executed properly, the replay system comprising:
a checker to determine whether each instruction has executed properly; and
a replay queue coupled to the checker to temporarily store one or more instructions for replay; and
a circuit, coupled to the replay system, to detect a stalled condition of the processor, one or more instructions being loaded into the replay queue when the stalled condition is detected.

14. The processor of claim 13 and further comprising a circuit to detect when the stalled condition has been released.

15. A multi-threaded processor comprising:
an execution unit to execute instructions;
a replay system coupled to the execution unit to replay instructions which have not executed properly, the replay system comprising:
a checker to determine whether each instruction has executed properly; and
a replay queue coupled to the checker to temporarily store one or more instructions for replay; and
a circuit, coupled to the replay system, to detect that one of the threads has stalled, one or more instructions of the stalled thread being loaded into the replay queue when the stalled condition is detected to allow instructions of other threads access to the execution unit.

16. A method in a multi-threaded processor, comprising:
detecting a stall or stalled condition in the processor by detecting that a retirement pointer of one or more of the threads has not changed for a minimum or predetermined period of time;
temporarily storing one or more instructions of one or more of the threads in a replay queue;
detecting that the stall or stalled condition has been broken or released; and
unloading the instructions from the replay queue for replay or re-execution.

17. A method in a multi-threaded processor having a replay queue, the method comprising:
temporarily storing one or more instructions of a first thread in a replay queue, while allowing the instructions of one or more remaining threads to execute;
unloading the first thread from the replay queue to allow the instructions of the first thread to execute; and
temporarily storing one or more instructions of a second thread in the replay queue, while allowing instructions of the one or more remaining threads to execute.

18. The method of claim 17 and further comprising unloading the second thread from the replay queue and reloading one or more instructions of the first thread into the replay queue until a stalled condition with the first thread is released.

19. A processor comprising:
an execution unit to execute instructions;
a replay system coupled to the execution unit to replay instructions which have not executed properly, the replay system comprising:
a checker to determine whether each instruction has executed properly; and
a replay queue coupled to the checker to temporarily store one or more instructions for replay; and
a circuit, coupled to the replay system, to temporarily store instructions of a first thread in the replay queue while allowing the instructions of one or more remaining threads to execute, and then to unload the first thread from the replay queue to allow the instructions of the first thread to execute.

20. A method in a multi-threaded processor having a replay queue, the method comprising:

detecting a stall or stalled condition with a first thread;

temporarily storing one or more instructions of the first thread in a replay queue, while allowing the instructions of one or more remaining threads to execute;

performing the following if the stalled condition is not released within a predetermined period of time:

unloading the first thread from the replay queue to allow the instructions of the first thread to execute;

temporarily storing one or more instructions of a second thread in the replay queue, while allowing instructions of the one or more remaining threads to execute; unloading the second thread from the replay queue; and reloading one or more instructions of the first thread into the replay queue until the stalled condition with the first thread is released.

\* \* \* \* \*

UNITED STATES PATENT AND TRADEMARK OFFICE
CERTIFICATE OF CORRECTION

PATENT NO. : 6,785,803 B1　　　　　　　　　　　　　　　　　　　　Page 1 of 1
APPLICATION NO. : 09/667248
DATED : August 31, 2004
INVENTOR(S) : Merchant et al.

It is certified that error appears in the above-identified patent and that said Letters Patent is hereby corrected as shown below:

In column 12, line 11, in Claim 2, delete "comprising;" and insert -- comprising: --, therefor.

Signed and Sealed this

Twenty-fifth Day of December, 2007

JON W. DUDAS
*Director of the United States Patent and Trademark Office*